United States Patent
Yin et al.

(10) Patent No.: US 7,207,098 B2
(45) Date of Patent: Apr. 24, 2007

(54) HARD MASK METHOD OF FORMING A READER OF A MAGNETIC HEAD

(75) Inventors: Huaqing Yin, Eden Prarie, MN (US); David C. Seets, Minnetonka, MN (US); Hong Wang, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 455 days.

(21) Appl. No.: 10/607,779

(22) Filed: Jun. 27, 2003

(65) Prior Publication Data
US 2004/0261253 A1 Dec. 30, 2004

(51) Int. Cl.
*G11B 5/187* (2006.01)
*G11B 5/23* (2006.01)

(52) U.S. Cl. .............. 29/603.12; 29/603.15; 29/603.16; 29/603.18; 360/119; 360/126; 360/324; 360/326

(58) Field of Classification Search ........... 29/603.11, 29/603.12, 603.13, 603.14, 603.15, 603.16, 29/603.18; 360/126, 313, 324, 324.11, 324.12, 360/326, 119; 204/192.34, 192.35
See application file for complete search history.

(56) References Cited

U.S. PATENT DOCUMENTS

| | | | |
|---|---|---|---|
| 3,904,462 A * | 9/1975 | Dimigen et al. ....... 204/192.34 |
| 4,949,039 A | 8/1990 | Grünberg | |
| 5,772,493 A | 6/1998 | Rottmayer et al. | |
| 5,777,542 A | 7/1998 | Ohsawa et al. | |
| 5,793,279 A | 8/1998 | Nepela | |
| 5,861,328 A | 1/1999 | Tehrani et al. | |
| 6,134,080 A * | 10/2000 | Chang et al. ............... 360/126 |
| 6,183,890 B1 | 2/2001 | Fujita | |
| 6,262,869 B1 * | 7/2001 | Lin et al. ............... 360/324.11 |
| 6,396,669 B1 * | 5/2002 | Gill ........................... 360/324 |
| 6,411,478 B1 | 6/2002 | Mao et al. | |
| 6,434,814 B1 * | 8/2002 | Chang et al. ............. 29/603.14 |
| 6,469,876 B1 | 10/2002 | Sasaki et al. | |
| 6,475,922 B1 | 11/2002 | Zheng | |

FOREIGN PATENT DOCUMENTS

JP  2005-108420  *  4/2005

OTHER PUBLICATIONS

"Advances in Dry Etching of GMR Materials", James M. Klemm and Edward W. Ostan., http://semiconductors.unaxis.com/en/chiponline_72dpi/issue4/c4p28_72.pdf.

* cited by examiner

*Primary Examiner*—A. Dexter Tugbang
(74) *Attorney, Agent, or Firm*—Kinney & Lange, P.A.

(57) ABSTRACT

A method of forming a reader of a magnetic head includes multiple processing steps. First, a sensor is formed having an air bearing surface. Next, a hard mask is formed on the sensor extending a distance from the air bearing surface substantially equal to the desired stripe height of the sensor. Finally, a portion of the sensor not covered by the hard mask is removed.

13 Claims, 7 Drawing Sheets

HARD MASK METHOD OF FORMING A READER OF A MAGNETIC HEAD

BACKGROUND OF THE INVENTION

The present invention relates to magnetic heads for use in a disc drive, and more particularly to a reader of a magnetic head.

A magnetic head of a magnetic data storage and retrieval system typically includes a reader portion for retrieving magnetic data stored on a magnetic medium. The reader is typically formed of several layers, which include a sensor, positioned between two insulating layers, which are in turn positioned between two shield layers. The sensor may be any one of a plurality of magnetoresistive (MR) type sensors, including anisotropic magnetoresistive (AMR), giant magnetoresistive (GMR), tunneling giant magnetoresistive (TMR), spin valve, and spin tunneling sensors. When the magnetic head is placed near the magnetic medium, a resistance of the sensor fluctuates in response to a magnetic field eminating from within transitions in the magnetic medium. By providing a sense current through the sensor, the resistance of the sensor can be measured and used by external circuitry to decipher the information stored on the magnetic medium.

One of the crucial steps in the formation of a reader of a magnetic head is the definition of the sensor stripe height. The stripe height is the distance between the front edge (defined as the air bearing surface) of the sensor and the back edge of the sensor. Prior art methods of forming the reader have experienced problems during the definition of the sensor stripe height. One of these problems occurs from a shadowing effect from the relatively thick photoresist layer that is used to mask the sensor. While the unmasked portions of the sensor are being removed, a shadow cast by the photoresist layer causes a tail to form on the back edge of the sensor. This tail, which extends backward from the back edge of the sensor along the surface of a first half gap results in a reduction of the sensitivity of the MR sensor. A second problem experienced by the prior art is the formation of redeposition material along the back edge of the photoresist layer. Even after the photoresist layer is removed the redeposition material remains on portions of the sensor device, which can result in unwanted electrical connections and a defect in the magnetic head's topography. A third problem that occurs in the prior art results from attempts to remove the redeposition material from the reader. While these processes can remove some of the redeposition material, the harsh redeposition removal processes can cause damage to other portions of the reader, or damage adjacent devices formed on the same wafer.

Therefore, there is a need in the art for a method of forming a reader of a magnetic head having a sensor formed with a steep back edge that does not form unwanted redeposition material or damage other features of the wafer.

BRIEF SUMMARY OF THE INVENTION

The present invention is a hard mask method of forming a reader of a magnetic head. The method involves the formation of a first half gap on top of a layer such as a shield layer. A sensor is then formed on top of the first half gap. Next, a hard mask is formed on top of the sensor. A photoresist mask is then patterned on top of desired portions of the hard mask. Unmasked portions of the hard mask are then removed, exposing unmasked portions of the sensor. The photoresist mask is subsequently removed exposing the hard mask. A steep dry etch is performed on both the sensor and the hard mask. This steep dry etch removes a top portion of the hard mask layer and all of the unmasked portion of the sensor, defining the stripe height of the sensor. Finally, a second half gap is deposited over the hard mask, sensor, and first half gap.

DETAILED DESCRIPTION

Figure 1:
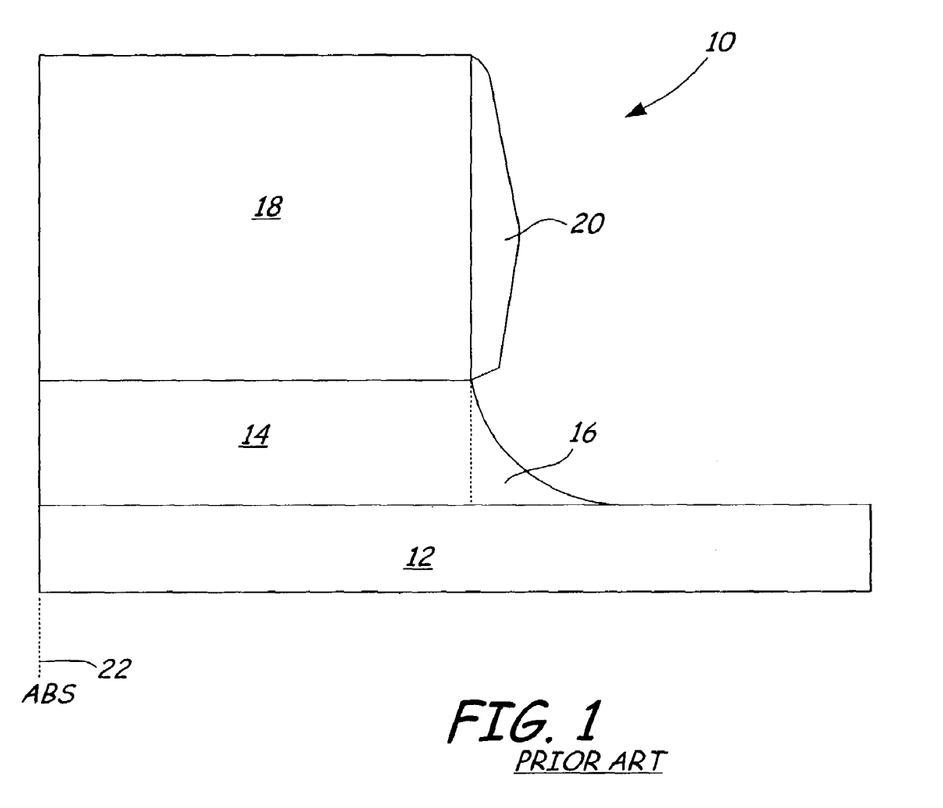
FIG. 1 is a layer diagram illustrating a prior art method of forming a reader of a magnetic head.

FIG. 1 is a layer diagram illustrating a prior art method of forming reader 10 of a magnetic head. Reader 10 includes first half gap 12, sensor 14 with tail 16, photoresist mask 18, redeposition material 20, and air bearing surface (ABS) 22. First half gap 12 is typically formed on top of a shield layer (not shown) of the magnetic head. Sensor 14 is formed on first half gap 12. Tail 16 of sensor 14 extends from a back edge of sensor 14 along a portion of the top surface of first half gap 12. Photoresist mask 18 is formed on sensor 14. Redeposition material 20 forms on a back surface of photoresist mask 18. The front edge of first half gap 12, sensor 14, and photoresist mask 18 is defined as air bearing surface 22.

Reader 10 is formed by first depositing first half gap 12. Next, sensor 14 is formed on top of first half gap 12. Sensor 14 may be a magnetoresistive (MR) sensor and includes multiple layers. Originally, sensor 14 is formed across the entire top surface of first half gap 12. It is desirable to remove portions of sensor 14 in order to define the desirable stripe height of sensor 14. The stripe height of sensor 14 is defined as the distance from the front edge of sensor 14 (at air bearing surface 22) to the back edge of sensor 14. In order to remove portions of sensor 14, a photoresist mask 18 is patterned on top of sensor 14. This allows the unmasked portion of sensor 14 to be removed as shown in FIG. 1.

The prior art magnetic heads have suffered from various problems that affect both the sensitivity of the reader as well as the reliability. One of the problems in the prior art is that tail 16 of sensor 14 is not removed during the removal of unmasked portions of sensor 14. Tail 16 is caused by a shadowing effect of photoresist mask 18 on sensor 14. The removal of unmasked portions of sensor 14 is typically performed by milling the surface with a slight milling angle such as five degrees from vertical. Photoresist layer 18 being on the order of several microns thick, casts a shadow on tail 16 of sensor 14. In this way, tail 16 is blocked from milling, and is not removed during the removal of unmasked portions of sensor 14.

Tail 16 is detrimental to the sensitivity of reader 10 because it causes adjacent layers of sensor 14 to be of different sizes, such that lower layers are longer than higher layers. In addition, tail 16 can result in problems with shunting currents flowing between non-adjacent layers of sensor 14, reducing the sensitivity of reader 30.

A second problem that occurs in prior art readers is the formation of redeposition material on various locations of the reader. For example, during the removal of unmasked portions of sensor 14, redeposition material 20 forms along the back edge of photoresist mask 18. This can be caused by the sputtering of material from sensor 14 onto the back edge of photoresist mask 18 during a process such as ion milling. The energetic ions of the ion mill bombard unmasked portions of sensor 14 causing the unmasked portions of sensor 14 to sputter onto the back edge of photoresist mask 18. Even after the removal of photoresist mask 18, redeposition material 20 remains on reader 10. Redeposition material 20 causes serious problems in reader 10. One of these problems is that redeposition material 20 may protrude through subsequently deposited layers of reader 10. Specifically, redeposition material 20 has been known to protrude through a subsequently deposited second half gap (not shown), which is designed to electrically insulate reader 10 from other features of the magnetic head. When redeposition material 20 protrudes through the second half gap, redeposition material 20 can make unwanted electrical connections between sensor 14 and other features of magnetic head 10. Thus, redeposition material 20 could form a fatal defect in reader 10, or at least significantly reduce the sensitivity of reader 10.

Because of the serious problems caused by redeposition material 20, efforts have been made to remove redeposition material 20 after the removal of photoresist layer 18. However, the processes used to remove redeposition material 20 are so aggressive that they can damage the magnetic head.

The present invention provides a method of forming a reader of a magnetic head without forming redeposition material. In addition, the method of the present invention forms a sensor with a tail-free steep back edge.

Figure 2:
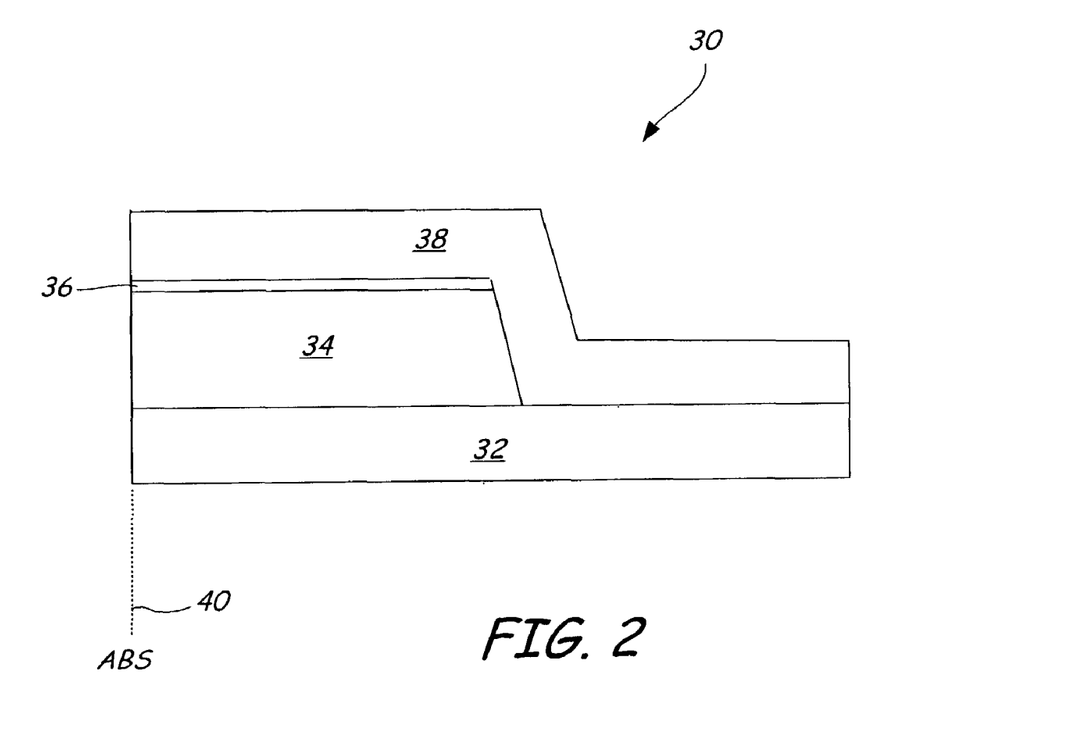
FIG. 2 is a layer diagram of the reader of the present invention.

FIG. 2 is a layer diagram of reader 30 of the present invention. Reader 30 includes first half gap 32, sensor 34, hard mask 36, second half gap 38, and air bearing surface (ABS) 40. The formation of reader 30 will be described in more detail with reference to FIGS. 3–7. First half gap 32 will be formed on top of other layers of the magnetic head, such as a bottom shield (not shown). Sensor 34 is formed over a portion of first half gap 32. Hard mask 36 is formed on top of sensor 34. Second half gap 38 is formed on top of hard mask 36, over the back edge of sensor 34, and over a portion of first half gap 32. A front edge of first half gap 32, sensor 34, hard mask 36, and second half gap 38 together define air bearing surface 40. As shown in FIG. 2, the method of forming reader 30 of the present invention eliminates the problems of the prior art by forming a steep back edge on sensor 34 without the formation of redeposition material. Further benefits of reader 30 will be subsequently described.

Figure 3:
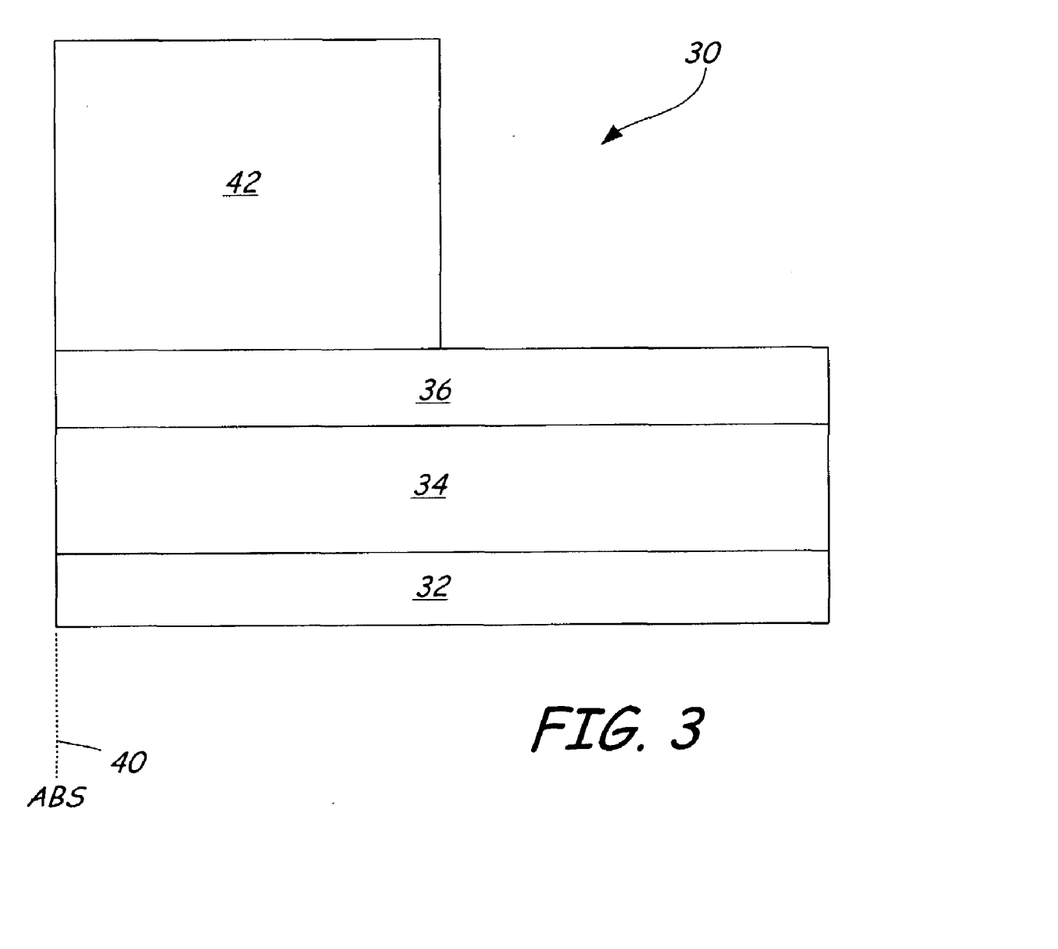
FIG. 3 is a layer diagram illustrating the formation of the reader.

FIG. 3 is a layer diagram illustrating the formation of reader 30. Reader 30 includes first half gap 32, sensor 34, hard mask 36, photoresist mask 42, and air bearing surface 40. Sensor 34 is formed on first half gap 32. Hard mask 36 is formed on sensor 34. Photoresist mask 42 is formed on a portion of hard mask 36. The front edge of first half gap 32, sensor 34, hard mask 36, and photoresist mask 42 together define air bearing surface 40.

In the formation of the layers of reader 30, any appropriate semiconductor fabrication processes may be used, including vacuum deposition, sputtering, atomic layer deposition, and standard photoresist processes. The first step in forming reader 30 is to form first half gap layer 32. First half gap layer 32 is formed on an adjacent layer of the magnetic head, such as a bottom shield layer (not shown). First half gap 32 is formed of an electrically insulating material such as an oxide or a nitride, for example $Al_2O_3$ or AlN.

After the formation of first half gap 32, sensor 34 is formed over the top of first half gap 32. Sensor 34 is a multilayered device, which can respond to a magnetic field emanating from within transitions in a magnetic medium. Sensor 34 may be any type of magnetic sensor including any one of a plurality of MR-type sensors, including anisotropic magnetoresistive (AMR), giant magnetoresistive (GMR), tunneling giant magnetoresistive (TMR), spin valve, and spin tunneling sensors, all of which are well known in the art. As shown in FIG. 3, sensor 34 is formed across the entire top surface of first half gap 32. As will be described, unwanted portions of sensor 34 will be removed in subsequent processing steps.

After the formation of sensor 34, hard mask 36 is formed on a top surface of sensor 34. Preferably, hard mask 36 is formed according to the following five criteria. First, hard mask 36 should be formed of an electrically insulating material that is thermally and mechanically compatible with the material of second half gap 38 (shown in FIG. 2). Second, hard mask 36 should have a low ion mill rate, preferably less than the ion mill rate of sensor 34. Third, hard mask 36 should be able to be patterned by a photoresist mask process. Fourth, hard mask 36 should be able to function as a portion of second half gap 38 (shown in FIG. 2). Fifth, the thickness of hard mask 36 will preferably be less than the thickness of reader 34, but thick enough that hard mask 36 is not entirely removed by a process of removing the unmasked portion of sensor 34, as will be described below. Suitable materials for hard mask 36 include various oxides or nitrides such as $Al_2O_3$ or AlN.

Since hard mask 36 is a very thin masking layer, hard mask 36 does not cause a shadowing effect on the back edge of sensor 34. The thickness of hard mask 36, which may be on the order of twenty-five nanometers, is much less than the thickness of photoresist layer 18 (as shown in FIG. 1) as used in the prior art. Since hard mask 36 does not cause a shadowing effect on the back edge of sensor 34, the back edge of sensor 34 can be formed with a tail-free steep back edge, as will be described below.

After the formation of hard mask 36, photoresist mask 42 is formed on top of hard mask 36. Photoresist mask 42 is then patterned to a width corresponding to the desired stripe height of sensor 34.

Figure 4:
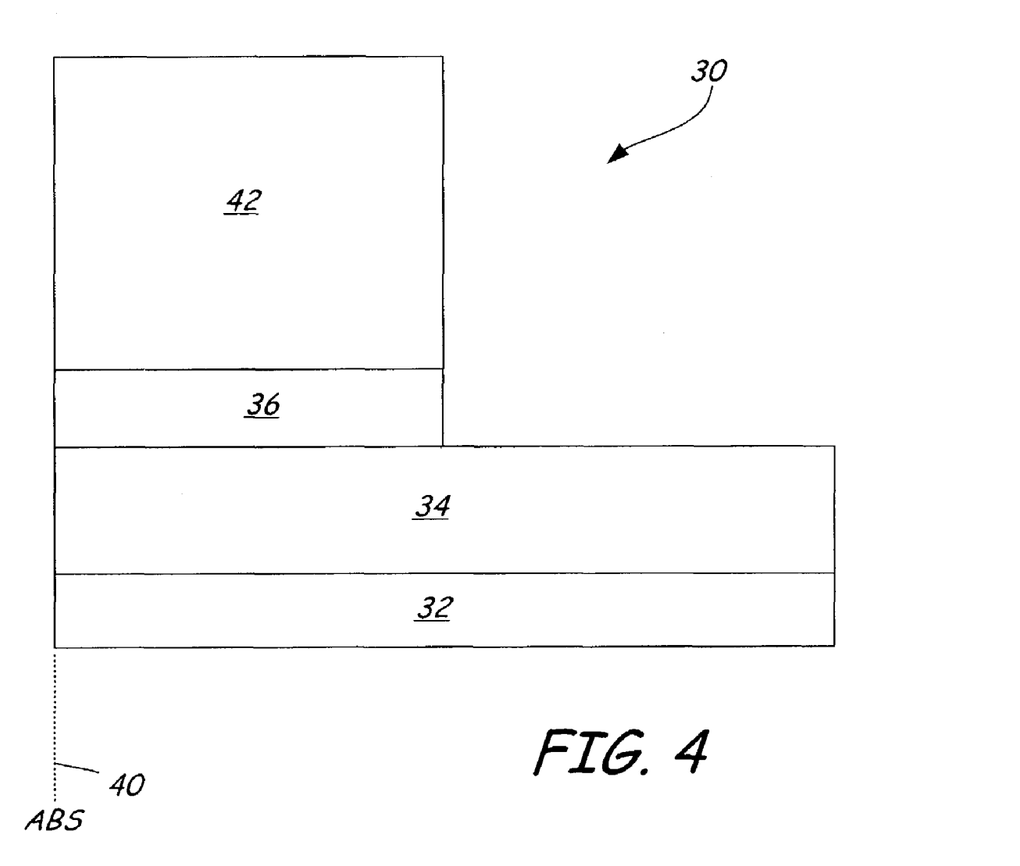
FIG. 4 is a layer diagram of the reader after the removal of the unmasked portion of the hard mask.

FIG. 4 is a layer diagram of reader 30 after the removal of the unmasked portion of hard mask 36. Reader 30 includes first half gap 32, sensor 34, hard mask 36, photoresist mask 42, and air bearing surface 40. After the formation of photoresist mask 42, the unmasked portion of hard mask 36 is removed. Photoresist mask 42 is provided to protect the masked portion of hard mask 36 from the removal process. The removal process can be any suitable semiconductor fabrication method known in the art such as a wet or dry etch. The removal process removes the unmasked portion of hard mask 36 but does not damage any other features on the wafer. After the unmasked portion of hard mask 36 has been removed, the width of hard mask 36 is substantially equal to the desired stripe height of sensor 34 and the width of photoresist mask 42.

Figure 5:
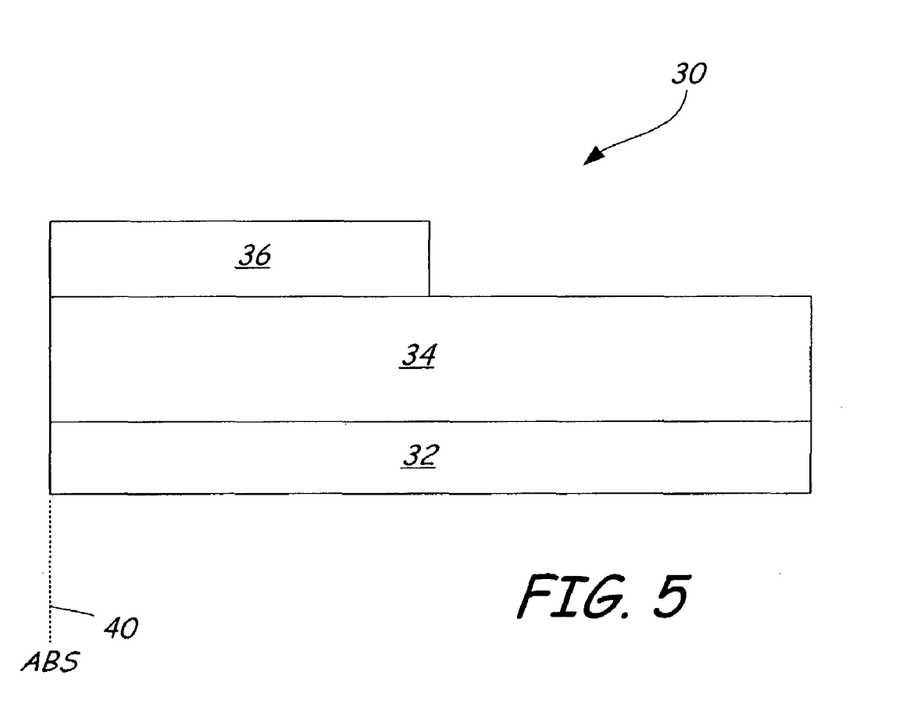
FIG. 5 is a layer diagram of the reader after the removal of the photoresist mask.

FIG. 5 is a layer diagram of reader 30 after the removal of photoresist mask 42. Magnetoresistive head 30 includes first half gap 32, sensor 34, hard mask 36, and air bearing surface 40. The front edge of first half gap 32, sensor 34, and hard mask 36 defines air bearing surface 40. After the removal of the unmasked portion of hard mask 36, photoresist mask 42 is no longer necessary. Photoresist mask is removed using any suitable semiconductor fabrication method known for stripping photoresist.

Figure 6:
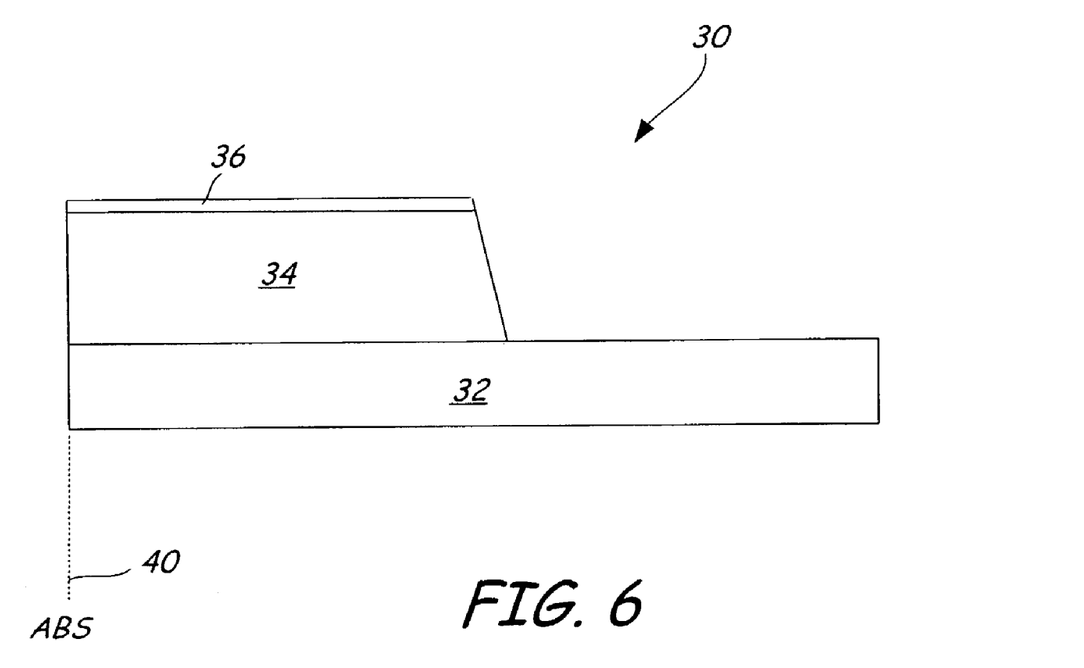
FIG. 6 is a layer diagram of the reader after the removal of the unmasked portion of the sensor.

FIG. 6 is a layer diagram of reader 30 after the removal of the unmasked portion of sensor 34. Reader 30 includes first half gap 32, sensor 34, hard mask 36, and air bearing surface 40. After the removal of photoresist mask 42, the stripe height of sensor 34 can now be defined. The benefits of using hard mask 36 will now become apparent. When defining the stripe height of sensor 34, it is desirable to form a steep back edge on sensor 34. The reason for this is that sensor 34 is a multilayered device. To maximize the sensitivity of sensor 34, it is desirable that adjacent layers within sensor 34 are of similar sizes. If the back edge of sensor 34 is not steep, or if a tail is formed along the back edge of sensor 34, then the cross section of the lower layers of sensor 34 will be greater than the cross section of higher layers of sensor 34. In addition to the size difference of the layers of sensor 34, a gentle sloping back edge of sensor 34 or a tail on the back edge of sensor 34 can also cause shunting current problems between non-adjacent layers of sensor 34.

In order to form the steep back edge on recorder 34, a process such as end point steep dry etch can be used. As previously described, hard mask 36 is formed such that it has a lower milling rate than sensor 34. While hard mask 36 is also etched during the steep dry etch process, the lower milling rate of hard mask 36 allows hard mask 36 to be thinner than sensor 34, while still protecting the masked portion of sensor 34. The steep dry etch process thins hard mask 36 by removing a top portion of hard mask 36 and also removes the entire unmasked portion of sensor 34. After the entire unmasked portion of sensor 34 has been removed, the steep dry etch process is completed. The original thickness of hard mask 36 is formed such that after the steep dry etch, a thin layer, on the order of five nanometers, of hard mask layer 36 remains on top of GMR 34 to ensure that the masked portion of sensor 34 is not damaged during the steep dry etch process.

As a further benefit, hard mask 36 is a sacrificial layer that is slowly removed as sensor 34 is etched. Since all exposed layers of reader 30 are being etched during the etching process, redeposition material from sensor 34 cannot form on the back edge of hard mask 36, or at any other locations of reader 30. Therefore, the present invention solves the problems with redeposition material experienced by the prior art.

Figure 7:
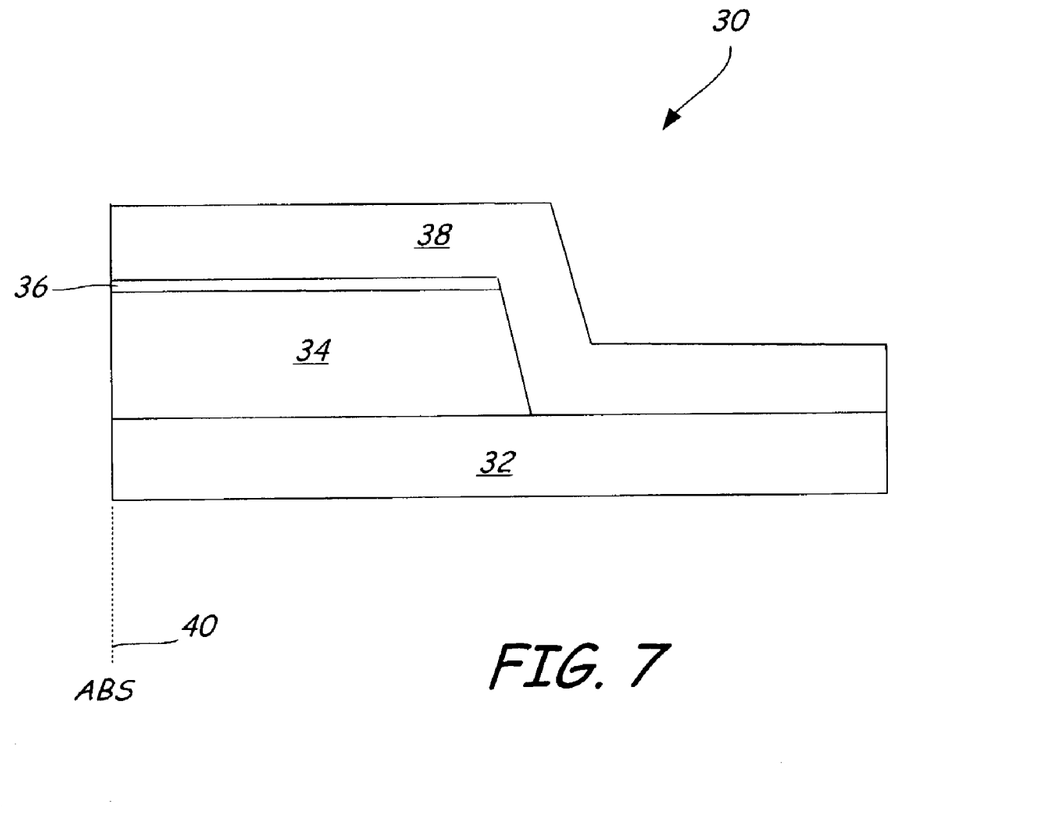
FIG. 7 is a layer diagram of the reader after the formation of the second half gap.

FIG. 7 is a layer diagram of reader 30 after the formation of second half gap 38. Reader 30 includes first half gap 32, sensor 34, hard mask 36, second half gap 38, and air bearing surface 40. After the stripe height formation process has been completed, second half gap 38 is deposited on top of the existing layers of reader 30, specifically, second half gap 38 is formed on top of hard mask 36, the back edges of hard mask 36 and sensor 34, and on top of the back portion of first half gap 32. The front edge of first half gap 32, sensor 34, hard mask 36, and second half gap 38 together define air bearing surface 40. Second half gap 38 is formed of an electrically insulating material such as an oxide or a nitride such as $Al_2O_3$ or AlN. Since both hard mask 36 and second half gap 38 are compatible electrically insulating materials, hard mask 36 functions as a portion of second half gap 38. With the formation of second half gap 38 complete, additional layers of reader 30 may be deposited on top of second half gap 38 as desired.

While the front edge of reader 30 has been described as air bearing surface 40, one skilled in the art will understand that air bearing surface 40 is a reference location and not an actual surface until further processing steps have been preformed. The actual air bearing surface can be formed through subsequent processing steps such as lapping and etching. In addition to this, the actual air bearing surface may be formed at a slightly different location due to the subsequent processing steps. For example, a protective overcoat, such as a diamond-like carbon may be subsequently formed over this surface, resulting in a slightly different location of the actual air bearing surface.

Although the present invention has been described with reference to preferred embodiments, workers skilled in the art will recognize that changes may be made in form and detail without departing from the spirit and scope of the invention.

The invention claimed is:

1. A method of forming a reader of a magnetic head, the method comprising:
  forming a sensor with an air bearing surface;
  forming a hard mask on the sensor extending from the air bearing surface a distance substantially equal to a desired stripe height of the sensor, wherein forming the hard mask comprises:
    depositing a hard mask layer over an entire top surface of the sensor;
    patterning a photoresist mask on a first portion of the hard mask layer; and
    removing a second portion of the hard mask layer not covered by the photoresist mask; and
  removing a portion of the sensor not covered by the hard mask to define the desired stripe height of the sensor.

2. The method of claim 1, further comprising thinning the hard mask during the removal of the portion of the sensor not covered by the hard mask.

3. The method of claim 2, further comprising forming a second half gap over the thinned hard mask.

4. The method of claim 3, further comprising forming the second half gap over a back edge of the sensor.

5. The method of claim 1, further comprising forming a first half gap prior to the formation of the sensor such that the sensor is formed above the first half gap.

6. The method of claim 1, wherein forming a sensor comprises forming a giant magnetoresistive sensor.

7. The method of claim 1, wherein removing the portion of the sensor not covered by the hard mask further comprises forming a steep back edge on the sensor.

8. The method of claim 1, wherein removing the portion of the sensor not covered by the hard mask further comprises steep dry etching the portion of the sensor not covered by the hard mask.

9. The method of claim 1, wherein forming a hard mask comprises forming a hard mask of an insulating material.

10. The method of claim 1, wherein forming a hard mask comprises forming a hard mask of aluminum nitride.

11. The method of claim 1, wherein forming a hard mask comprises forming a hard mask of aluminum oxide.

12. A method of forming a reader of a magnetic head, the method comprising:
  forming a first half gap;
  forming the reader on the first half gap;
  forming a hard mask on the reader;
  patterning a photoresist mask on a first portion of the hard mask;
  removing a portion of the hard mask not covered by the photoresist mask;

removing the photoresist mask;

removing a portion of the reader not covered by the hard mask to form a back edge of the reader that defines a stripe height of the reader; and forming a second half gap over the hard mask, adjacent the back edge of the reader, and over a portion of first half gap not covered by the reader.

13. The method of claim 12, wherein removing a portion of the reader not covered by the hard mask comprises end point steep dry etching a portion of the reader not covered by the hard mask.

* * * * *